United States Patent [19]

Berens

[11] 4,266,440

[45] May 12, 1981

[54] STEERING UNIT

[75] Inventor: Mathew Berens, Battle Creek, Mich.

[73] Assignee: Nippon Cable System Inc., Takarazuka, Japan

[21] Appl. No.: 34,144

[22] Filed: Apr. 27, 1979

[30] Foreign Application Priority Data

Nov. 30, 1978 [JP] Japan ............... 53/165736[U]

[51] Int. Cl.³ ............................................... F16C 1/10
[52] U.S. Cl. .................................... 74/501 R; 114/160
[58] Field of Search ................. 115/18 R; 114/144 R, 114/160, 161; 74/480 B, 501 R, 506; 242/77, 77.3, 77.4, 125.1

[56] References Cited

U.S. PATENT DOCUMENTS

| 1,293,383 | 2/1919 | Eaton | 242/125.1 |
| 3,258,989 | 7/1966 | Frese et al. | 74/501 |
| 3,357,393 | 12/1967 | Urbassik | 242/125.1 X |
| 3,363,881 | 1/1968 | Kobelt | 74/506 X |
| 3,443,451 | 5/1969 | Zieber, Jr. | 74/501 |
| 3,627,360 | 12/1971 | Berno | 74/501 X |
| 3,771,384 | 11/1973 | Hackman | 74/501 R |

*Primary Examiner*—Sherman D. Basinger
*Attorney, Agent, or Firm*—Armstrong, Nikaido, Marmelstein & Kubovcik

[57] ABSTRACT

A steering unit comprised of a housing which has a disc rotatably mounted therein. The disc has a grooved outer peripheral surface and has a push-pull control cable attached thereto. The push-pull control cable is attached to the disc via an inner cable. The improvement comprises a concave portion formed in the outer peripheral surface of the disc. This concave portion extends into the outer peripheral surface of the disc to a greater degree than the groove which is in the peripheral surface of the disc. The inner cable is attached to the disc at the low point of this concave indentation in the periphery of the disc. The inner cable and the concave portion of the disc are connected by means of an end fitting extending between the end of the cable and the concave portion. The end fitting is generally inclined from the groove in the disc into the concave portion whereat a head portion secures the head fitting to the concave portion of the disc.

5 Claims, 5 Drawing Figures

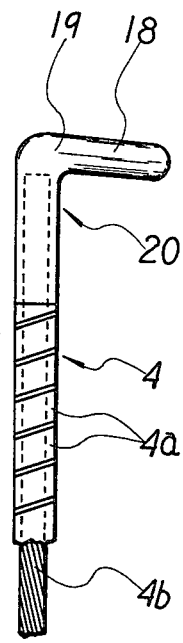
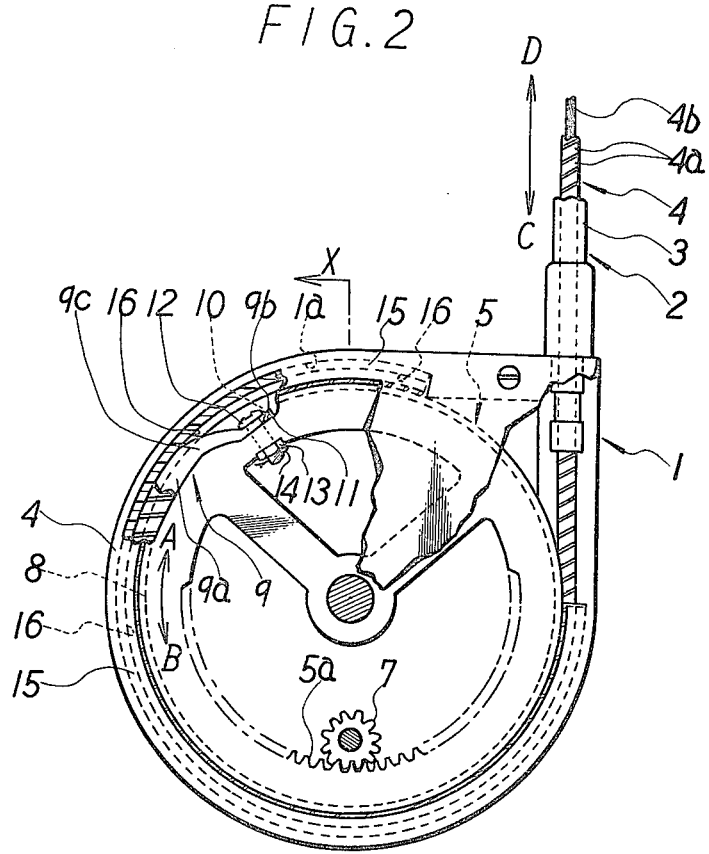
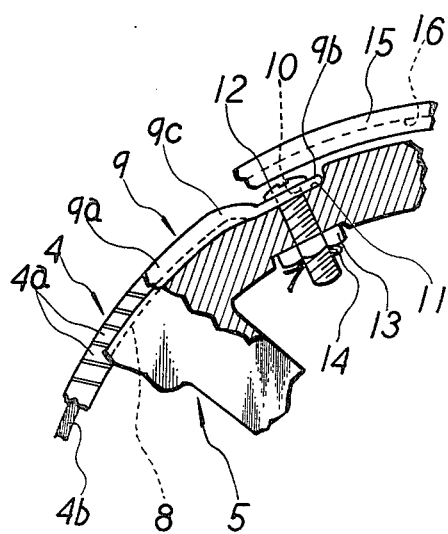
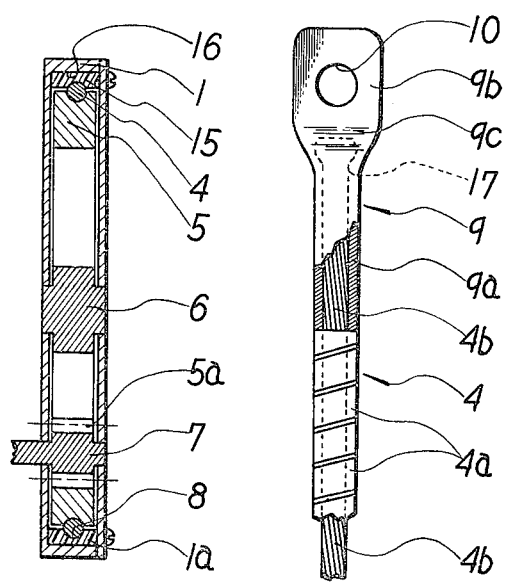

STEERING UNIT

BACKGROUND OF THE INVENTION

The present invention relates to an improved steering unit for a boat, and more particularly to an improvement in a steering unit which includes an inner cable disposed within a push-pull control cable, one end thereof being secured to an outer peripheral surface of a disc rotatably mounted in a housing.

One of the steering units of this type, as are known in the art, is so constructed that a bend portion 18 of an end fitting 20 fitted to one end of an inner cable 4 is fixedly engaged in a hole provided in a disc and extending in the axial direction as shown in FIG. 1, and a helm or an outboard engine (hereinafter referred to as "a helm means") which is connected to the other end of the inner cable 4 is operated by pushing and pulling operations caused by the rotational movement of the disc. In general, a steering unit is subjected to considerable shock by repeated waves striking the helm means. Therefore, a corner 19 of the bend portion 18 will be fatigued from the repeated pushing and pulling operations of the inner cable 4 finally resulting in breakage at the corner 19. Thus, there is a fatal disadvantage in the conventional steering unit. Further, there are often generated cracks in the corner 19 during the bending process of the end fitting 20. These cracks are often invisible. Therefore, the above hazard cannot be eliminated readily.

OBJECTS OF THE INVENTION

An object of the present invention is to provide a new steering unit which can reliably perform a steering function safely for a long period of time even when the helm means is subjected to considerable shock as a result of being struck repeatedly by waves.

Other objects of the invention will become apparent from the following description given with reference to the accompanying drawings.

BRIEF DESCRIPTION OF THE DRAWINGS

FIG. 1 is a plan view showing the structure of an end portion of an inner cable employed in the conventional steering unit;

FIG. 2 is a partially cutaway plan view showing the main parts of an embodiment of the present invention;

FIG. 3 is an enlarged plan view showing the main parts of the embodiment of FIG. 2;

FIG. 4 is a sectional view taken on line X—X of FIG. 2; and

FIG. 5 is a partially cutaway and enlarged front view showing the structure of an end fitting of an inner cable employed in the embodiment of FIG. 2.

DETAILED DESCRIPTION

Referring to FIG. 2, numerals 1 and 2 designate a housing and a push-pull control cable (hereinafter referred to as "a control cable"), respectively. The control cable 2 comprises an inner cable 4 having a resistance against the push-pull loads and a flexible conduit 3 having elasticity in which the inner cable 4 is slidably disposed. A taping 4a made of, for instance, polyvinyl chrroride, may be circumferentially arranged around the core element 4b. A disc 5 has an inner teeth 5a in mesh with a pinion 7 and is rotatably mounted in the housing 1 by a shaft 6. The inner cable 4 is wound in a groove 8 formed in an outer peripheral surface of the disc 5 and secured by means of an end fitting 9 made of metal to a suitable part of the disc 5.

As shown in FIGS. 3 and 5, the end of the inner cable 4 is secured to a leg portion 9a of the end fitting 9. The end fitting 9 has a head portion 9b extending from the leg portion 9a via inclined portion 9c the inclination of which is small. The head portion 9b may be flat, if desired, and is provided at the center thereof with a hole 10. A concave portion 11 is formed at a suitable part of an outer peripheral surface of the disc 5. The head portion 9b of the end fitting 9 can be so engaged in the concave portion 11 that there is no play at least in the axial direction of the inner cable 4. The end fitting 9 is secured to the disc 5 by a bolt 12 and/or a nut 13 and split pin 14.

As shown in FIG. 4, an unguent 15 made of synthetic resin such as polyamides in order to reduce sliding friction is engaged to an inner surface 1a of the housing 1. The unguent 15 has a groove 16 in which the inner cable 4 can slide, by which sliding friction of the inner cable 4 in winding up is reduced to a minimum.

The advantages and operations of the present invention will become apparent from the following description.

When the disc 5 is rotated in the direction of A or B by the rotation of the pinion 7, the inner cable 4 secured at one end thereof to the disc 5 is operated in the direction of C or D to operate the helm means (not shown) connected to the other end of the inner cable 4. In that case, the helm means is subjected to a great shock caused by waves repeatedly. Therefore, the inner cable 4 gets the pushing and pulling loads (in the direction of C or D) thereon. The load is transmitted through the curved portion of the inner cable 4 disposed between the disc 5 and the unguent 15, to the end fitting 9. The inner cable 4 can withstand such a load since the head portion 9b of the end fitting 9 is so secured to the concave 11 that there is no play. Further, the inner cable 4 is never cut off at the end fitting 9 since the inclined portion or curved portion 9c has no cracks due to the inclination being small. Therefore, the steering unit of the present invention can perform steering function safely and reliably for a long period of time.

As shown in FIG. 5, fitting of the end portion of the inner cable 4 to the end fitting 9 is conducted by die casting against the end portion of a core element 4b of inner cable 4 in which a prescribed length of a taping 4a is stripped, or by caulking of the end fitting 9. In order to obtain a strong fitting, the end portion of the core element 4b may be provided with an enlarged part 17. Further, a metal fitting instead of the enlarged part 17 may be secured by means of caulking or welding to the end portion 4b of the inner cable 4. In addition, the end portion of the core element 4b of the inner cable 4 may be swaged without stripping the taping 4a, to which the end fitting 9 is secured.

As above-mentioned, in the steering unit of the present invention, the connection of the disc with the end portion of the inner cable is very strong and the end fitting is never cut off. Therefore, the steering unit of the present invention can safely and reliably perform a steering function for a long period of time.

it is to be understood that the invention is not limited in its application to the details of construction and arrangement of parts set forth in the above general description or illustrated in the accompanying drawings since the invention is capable of other embodiment and of being practiced or carried out in various ways. Also, it is to be understood that the phraseology or terminology employed herein is for the purpose of description and not limitation.

What is claimed is:

1. A steering unit comprising:
 a housing:
 a disc rotatably mounted in said housing, said disc having a grooved outer peripheral surface;
 a push-pull control cable, said push-pull control cable being further comprised of an inner cable, wherein said inner cable has a first end secured to said disc, wherein the improvement comprises a concave portion formed in said outer periphery surface of said disc, said concave portion extending into said outer peripheral surface of said disc to a greater degree than said groove in said peripheral surface to a point where said first end of said inner cable is connected to said disc by means of an end fitting extending between said first end of said inner cable and said concave portion of said disc, said end fitting having a curved portion extending from said groove into said concave portion wherein a head portion of said end fitting is secured to said concave portion of said disc.

2. The steering unit of claim 1, wherein the end fitting is secured by die casting, to an end portion of the inner cable.

3. The steering unit of claim 1, wherein the end fitting is secured by caulking, to an end portion of the inner cable.

4. The steering unit of claim 1, wherein the end fitting is secured to an enlarged end portion of the inner cable.

5. The steering unit of claim 1, wherein the end fitting is secured to an end portion of the inner cable which is swaged.

* * * * *